July 13, 1943.  F. I. RUTLEDGE  2,324,324
CASTING REEL
Filed June 19, 1941  3 Sheets-Sheet 1
Fig. 1.
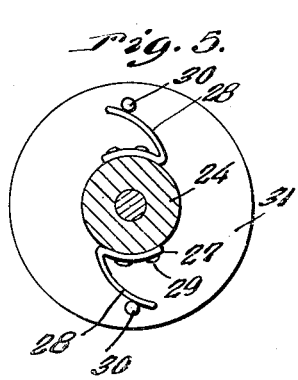
Fig. 5.
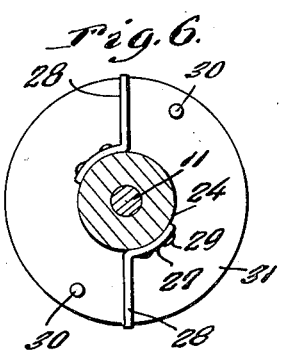
Fig. 6.
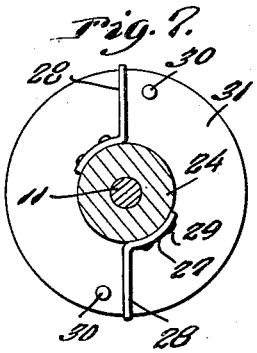
Fig. 7.
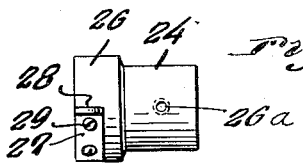
Fig. 8.
Inventor
Frank I. Rutledge
By *Clarence A. O'Brien*
Attorney July 13, 1943.  F. I. RUTLEDGE  2,324,324
CASTING REEL
Filed June 19, 1941   3 Sheets-Sheet 2
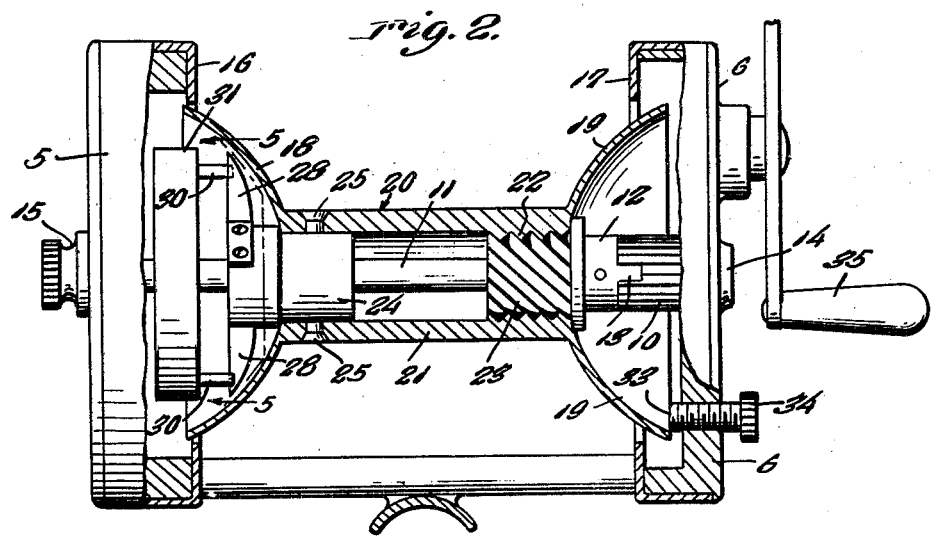
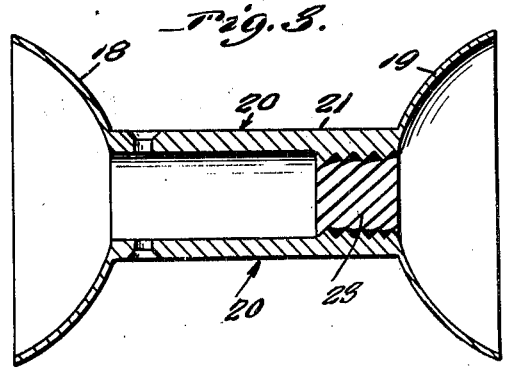
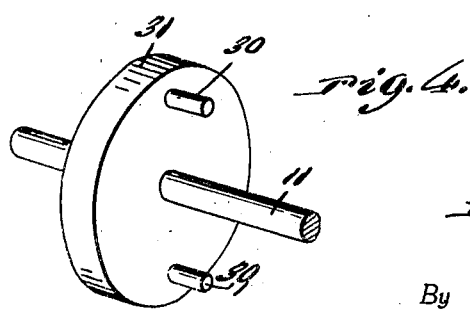
Inventor
Frank I. Rutledge
By Clarence A. O'Brien
Attorney July 13, 1943.  F. I. RUTLEDGE  2,324,324
CASTING REEL
Filed June 19, 1941  3 Sheets-Sheet 3
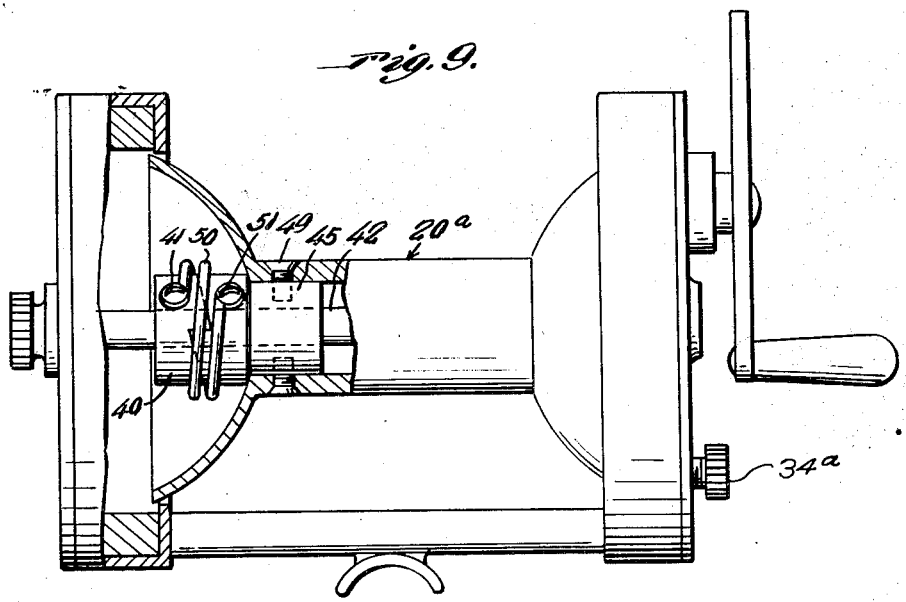
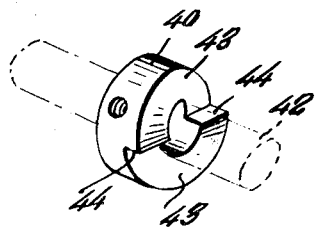
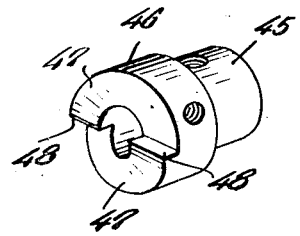
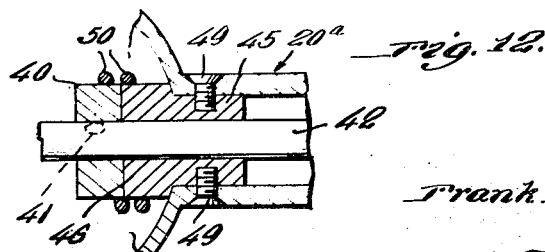
Inventor
Frank I. Rutledge
By Clarence A. O'Brien
Attorney Patented July 13, 1943

2,324,324

UNITED STATES PATENT OFFICE 2,324,324

CASTING REEL

Frank I. Rutledge, Pittsburgh, Pa.

Application June 19, 1941, Serial No. 398,820

3 Claims. (Cl. 242—84.5)

The present invention appertains to new and useful improvements in fishing reels, the principal object of the invention being to provide a reel constructed in such a manner as to eliminate certain action of the reel, known as "backlash" which occurs when casting and which is principally due to overrunning of the spool of the reel.

Another important object of the invention is to provide a "backlash" preventer for fishing reels which in use will not interfere with the line winding operation of the spool, the same taking effect automatically when the reel is used in casting.

Other important objects and advantages of the invention will become apparent to the reader of the following specification.

In the drawings:

Figure 1 represents a longitudinal sectional view of the reel with the parts thereof in casting position.

Figure 2 is a fragmentary longitudinal sectional view through the reel with the parts in braked position.

Figure 3 is a longitudinal sectional view through the spool.

Figure 4 is a fragmentary perspective view showing the shaft and flywheel.

Figure 5 is a sectional view taken substantially on the line 5—5 of Figure 2, showing the position of the flywheel pins and springs at the start of a cast.

Figure 6 is a sectional view taken substantially on the same line as Figure 5 showing the position of the flywheel pins and springs immediately after the cast.

Figure 7 is a sectional view taken substantially on the same line as Figure 5 showing the flywheel pins and springs in the position they assume after the line has pulled on the spool, releasing the brake.

Figure 8 is a side elevational view of the spool plug.

Figure 9 is a rear elevational view of a slightly modified form of the invention, with parts broken away.

Figure 10 is a perspective view of one clutch member and its shaft.

Figure 11 is a perspective view of the clutch plug.

Figure 12 is a fragmentary longitudinal sectional view showing the clutch elements in interlocked relation.

Referring to the drawings wherein like numerals designate like parts, it can be seen in Figures 1 and 2 that numerals 5 and 6 represent the end walls of the reel, the end wall 6 having a bearing-like boss 7 through which a stub shaft 8 is disposed and equipped at its inner end with a gear 9 meshing with an elongated pinion 10 on a shaft 11. On this shaft 11 is a collar 12 having a sliding connection 13 with said pinion 10.

The shaft 11 is journaled through a bearing boss 14 in the wall 6 at one end, while its other end is disposed into a bearing 15 which is threadedly disposed into the end wall 5.

The end walls 5 and 6 are hollow and are partly closed at their inner sides by annular rims 16 and 17 into and out of which are movable concavo-convex end walls 18 and 19 of a spool generally referred to by numeral 20, this spool including a hollow core 21 internally threaded as at 22, at one end thereof for receiving a threaded body or worm 23 on the shaft 11.

A plug 24 is disposed into the opposite end of the core 21 and is secured in place with respect to the core 21 by set screws 25. These set screws being disposed into threaded openings 26a of said plug 24.

The plug 24 has a head 26 to which foot portions 27 of outwardly disposed spring fingers 28 are secured as at 29. There is preferably a pair of these spring fingers 28 and they radiate from the head 26 and are cooperative with laterally extending pins 30 on a flywheel 31. This flywheel is secured to the shaft 11.

In the operation of the reel, it can be seen that immediately upon start of a cast, the springs 28 will abut the pins 30 and become flexed as shown in Figure 5. As the line is paid out, as is usual, the velocity of the plug or sinker will slacken with the result that the spool 20 will have a tendency to travel faster than the travel of the line, and this heretofore has caused backlash and frequent complicated entanglements of the line on the spool.

In the present invention, when the pulling effect of the line on the reel has slackened, the springs 28 will force the flywheel 31 to rotate, rotating the shaft 11 and through the medium of the worm 23 cause travel of the spool, to the end that the spool is moved toward the right, from the position shown in Figure 1 to the position shown in Figure 2, to the end that the end wall 19 of the spool is brought to braking position against a brake element 33.

The brake element 33 is in the form of a screw 34 adapted to be fed through the wall 6 to the desired adjusted position.

Obviously, winding of the reel is accomplished by the handle 35 on the outer end of the stub shaft 8.

As the line is still in flight and the spool has been momentarily braked against the brake screw 33, as soon as pulling effect of the line again takes place on the spool, the spool will feed itself toward the left in Figure 2 to again assume the position shown in Figure 1, free from the brake element 33.

When the line is to be rewound, rotation of the shaft 8 will cause rotation of the pinion 10 by the gear 9. This will result in rotation of the worm 23 and spool 20 in unison for the reason that the shaft 11, in driving the flywheel 31 will result in the pins 18 riding against the springs 28 and thus driving the plug 24 causes winding action of the spool. In this action of the spool the tendency is, of course, to maintain the spool in the position shown in Figure 1 to clear the brake 34.

A modification of the invention is shown in Figures 9, 10, 11 and 12 and in this form of the invention the flywheel 31, pins 30 and springs 28 are eliminated and substituted for by a clutch collar 40 secured by a set screw 41 to a shaft 42 which corresponds to the shaft 11 in Figure 2. The clutch 40 is provided with the cam surfaces 43, 43 terminating in clutch shoulders 44, 44. In one end portion of spool 20a is disposed the reduced portion 45 of a clutch plug 46 which has cam surfaces 47, 47 terminating in clutch shoulders 48, 48. Set screws 49 are employed for securing the plug 46 definitely in a position as shown in Figure 9 so that the collar 40 will rotate with the spool 20a.

In casting a plug with the modified form immediately above referred to, it will be seen that the spring 50 serves as a force effecting medium, to rotate the spool 20a when the fishing line slackens during the casting operation, thus causing the spool to rotate and feed on the worm (not shown but corresponding to the worm 23 of the preferred form,) until the spool is snubbed by friction against a set screw 34a, corresponding to the brake effecting screw 34 of the preferred form. Obviously, as a pull is again effected on the reel by continual action of the line and plug, the spool will rotate in the opposite direction resulting in the feeding of the spool to the left in Figure 9 so that the spool is not engaging the brake element 34a.

A coiled tension spring 50 convolutes the collar 40 and plug 46 and has one end secured by the set screw 41 to the collar 40 while its other end is secured by a set screw 51 to the clutch plug 46.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a fishing reel, a pair of side members, a shaft supported at its ends by the side members, a spool rotatably mounted on the shaft, a worm on the shaft, said spool being internally threaded for mesh with the worm, a brake element, and spring means between the spool and the shaft arranged to rotate the spool when not under the effect of a line pull in a direction to cause the spool to ride the worm and move into contact with the brake element to have its action snubbed by friction with the brake element.

2. In a fishing reel, a pair of side members, a shaft supported at its ends by the side members, a spool rotatably mounted on the shaft, a worm on the shaft, said spool being internally threaded for mesh with the worm, a brake element, and spring means between the spool and the shaft arranged to rotate the spool when not under the effect of a line pull in a direction to cause the spool to ride the worm and move into contact with the brake element to have its action snubbed by friction with the brake element, said spring means comprising a flywheel on the shaft, a pin projecting laterally from the flywheel, a spring finger carried by the spool and being in the path of the pin.

3. In a fishing reel, a pair of side members, a shaft supported at its ends by the side members, a spool rotatably mounted on the shaft, a worm on the shaft, said spool being internally threaded for mesh with the worm, a brake element, and spring means between the spool and the shaft arranged to rotate the spool when not under the effect of a line pull in a direction to cause the spool to ride the worm and move into contact with the brake element to have its action snubbed by friction with the brake element, said spring means comprising a collar carried by the shaft, a collar through which the shaft is disposed, said second collar being carried by the spool, cam formations between the collars, and a spring element connecting the collars and normally tending to rotate the collars in a camming direction.

FRANK I. RUTLEDGE.